(12) United States Patent
Lenczewski et al.

(10) Patent No.: US 9,593,762 B2
(45) Date of Patent: Mar. 14, 2017

(54) DRIVE AXLE WITH PUMP MANAGED OIL FLOW

(71) Applicant: American Axle & Manufacturing, Inc., Detroit, MI (US)

(72) Inventors: Adrian M. Lenczewski, Southfield, MI (US); Robert Degowske, Fair Haven, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/674,073

(22) Filed: Mar. 31, 2015

(65) Prior Publication Data

US 2016/0290484 A1 Oct. 6, 2016

(51) Int. Cl.
*F16H 57/04* (2010.01)
*F16H 48/08* (2006.01)

(52) U.S. Cl.
CPC ......... *F16H 57/0483* (2013.01); *F16H 48/08* (2013.01); *F16H 57/045* (2013.01); *F16H 57/0436* (2013.01); *F16H 57/0441* (2013.01); *F16H 57/0471* (2013.01); *F16H 57/0445* (2013.01)

(58) Field of Classification Search
CPC ............. F16H 57/0483; F16H 57/0471; F16H 57/045; F16H 57/0445; F16H 57/0441; F16H 48/08; F16H 57/0436
USPC .................................. 475/160, 222, 230, 231
See application file for complete search history.

(56) References Cited

U.S. PATENT DOCUMENTS

| | | | |
|---|---|---|---|
| 4,468,981 A | 9/1984 | Ries | |
| 5,302,158 A | 4/1994 | Kwasniewski | |
| 5,540,300 A | 7/1996 | Downs et al. | |
| 5,709,135 A | 1/1998 | Baxter | |
| 6,464,056 B1 * | 10/2002 | Lowell | F16H 48/22 192/103 F |
| 6,502,665 B1 * | 1/2003 | Brehob | F16H 57/0483 184/11.2 |
| 6,953,411 B2 * | 10/2005 | Burns | B01D 29/055 192/103 F |
| 6,966,396 B2 * | 11/2005 | Forsyth | B60K 17/34 180/249 |
| 7,534,193 B2 * | 5/2009 | Baxter, Jr. | F16D 48/066 192/85.24 |

(Continued)

*Primary Examiner* — Roger Pang
(74) *Attorney, Agent, or Firm* — Harness, Dickey & Pierce, P.L.C.

(57) ABSTRACT

A power transfer device can include a housing, first and second input members, first and second output members, a differential, and a pump. The housing can define a sump. The first input member can receive rotational power and rotate about an axis. The second input member can be meshingly engaged with the first input member and can rotate through the sump. The differential case can be drivingly coupled to the second input member. The differential gearset can transmit rotary power between the differential case and the first and second output members. The pump can be disposed about the first input member and can have an inlet, outlet, and pump element. The inlet can be coupled for fluid communication with the sump. The pump element can be drivingly coupled to the first input member and can pump the fluid from the sump when the first input member rotates about the axis.

17 Claims, 5 Drawing Sheets

(56) References Cited

U.S. PATENT DOCUMENTS

| | | | |
|---|---|---|---|
| 2003/0096670 A1* | 5/2003 | Hunt | F16H 48/22 |
| | | | 475/86 |
| 2005/0167228 A1* | 8/2005 | Baxter | F16H 48/08 |
| | | | 192/49 |
| 2010/0105513 A1* | 4/2010 | Hilker | F16H 48/38 |
| | | | 475/160 |
| 2012/0073403 A1* | 3/2012 | Perakes | F16H 57/0483 |
| | | | 74/607 |

* cited by examiner

DRIVE AXLE WITH PUMP MANAGED OIL FLOW

FIELD

The present disclosure relates to a driveline component with a drive axle having a pump managed oil flow.

BACKGROUND

This section provides background information related to the present disclosure which is not necessarily prior art.

Driveline components, such as a semi-float beam axle or a disconnecting drive module in an all-wheel drive ("AWD") system for example, include an input pinion gear disposed within a housing and meshingly engaged with a ring gear of an input member. The input pinion gear is generally fixedly coupled to a pinion shaft. The pinion shaft is supported by a first set of bearings for rotation about a first axis relative to the housing. The input member and ring gear are generally supported by a second set of bearings for rotation relative to the housing about a second axis that is transverse to the first axis. The input member is generally drivingly coupled to a set of vehicle wheels via a differential gearset. The housing includes a sump that is configured to hold a volume of lubricant fluid through which the ring gear rotates to lubricate and cool the ring and pinion gears. The ring gear generally slings lubricant fluid within the housing to lubricate and cool various other components, such as the first and second sets of bearings for example. It is advantageous to reduce the amount of fluid in the sump to reduce system drag torque due to the ring gear churning through the fluid in the sump. However, sufficient fluid must be maintained to lubricate and cool the components. As a result, it can be difficult to maintain the optimal amount of fluid within the sump for lubrication and cooling while minimizing drag losses.

SUMMARY

This section provides a general summary of the disclosure, and is not a comprehensive disclosure of its full scope or all of its features.

The present teachings provide for a power transfer device including a housing, a fluid, a first input member, a second input member, a first output member, a second output member, a differential, and a pump. The housing can define a sump. The fluid can be received in the sump. The first input member can be configured to receive rotational power and rotate about a first axis. The first input member can include a first input shaft and a first gear face. The second input member can include a second gear face that can be meshingly engaged with the first gear face and can be configured to rotate through the sump. The differential can include a differential case and a differential gearset. The differential case can be drivingly coupled to the second input member. The differential gearset can be configured to transmit rotary power between the differential case and the first and second output members. The pump can be disposed about the first input shaft and can have an inlet, an outlet, and a pump element. The inlet can be coupled for fluid communication with the sump. The pump element can be drivingly coupled to the first input shaft and can be configured to pump the fluid from the sump when the first input shaft rotates about the first axis.

The present teachings further provide for a power transfer device including a housing, a fluid, a first input member, a second input member, a first output member, a second output member, a differential, and a pump. The housing can define a sump. The fluid can be received in the sump. The first input member can be configured to receive rotational power and rotate about a first axis. The second input member can be meshingly engaged with the first input member and can be configured to rotate through the sump. The differential can include a differential case and a differential gearset. The differential case can be drivingly coupled to the second input member. The differential gearset can be configured to transmit rotary power between the differential case and the first and second output members. The pump can include a pump housing and a first rotor. The pump housing can have an inlet that can be coupled for fluid communication with the sump. The first rotor can be rotatably received within the pump housing and can be disposed about a portion of one of the first or second input members. The first rotor can be coupled for common rotation with the one of the first or second input members. The pump can be configured to pump the fluid from the sump when the first rotor rotates within the housing.

The present teachings further provide for a power transfer device including a housing, a fluid, a first input member, a second input member, a first output member, a second output member, a differential, and a gerotor pump. The housing can define a sump. The fluid can be received in the sump. The first input member can be configured to receive rotational power and rotate about a first axis. The second input member can be meshingly engaged with the first input member and can be configured to rotate through the sump. The differential can include a differential case and a differential gearset. The differential case can be drivingly coupled to the second input member. The differential gearset can be configured to transmit rotary power between the differential case and the first and second output members. The gerotor pump can include an inner rotor and an outer rotor. The inner rotor can have a plurality of outer teeth and can be coupled for common rotation with the first input member about the first axis. The outer rotor can have a plurality of inner teeth that can be meshingly engaged with the plurality of outer teeth. The outer rotor can be disposed about the inner rotor and can be rotatable about a second axis that is offset from the first axis. The gerotor pump can be configured to pump the fluid from the sump when the inner rotor rotates about the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
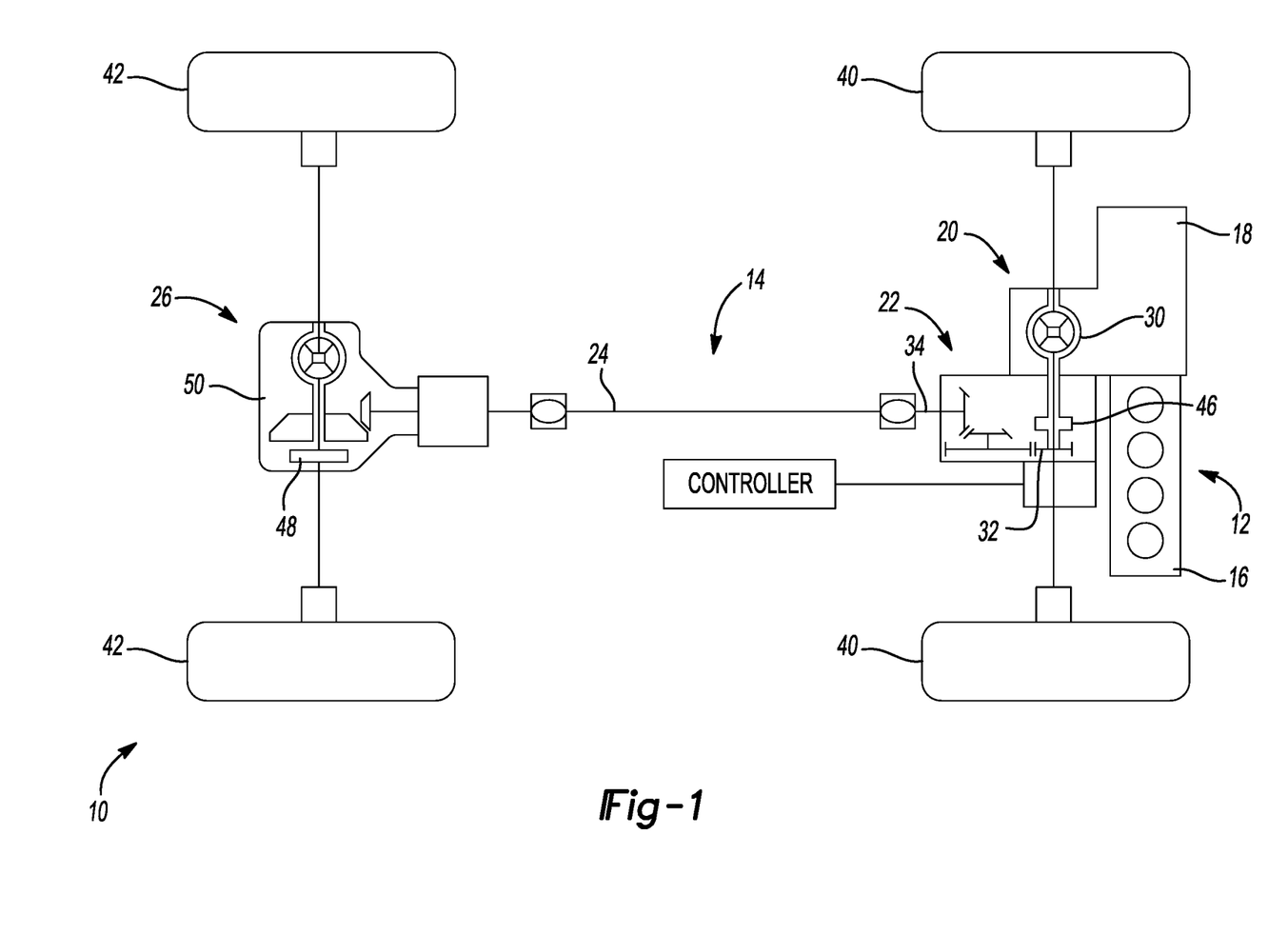
FIG. 1 is a schematic view of a vehicle having a driveline component constructed in accordance with the present teachings.

With reference to FIG. 1 of the drawings, an example of a vehicle having a driveline component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive ("AWD") configuration, but those of skill in the art will appreciate that the teachings of the present disclosure are applicable to other drive train configurations, including four-wheel drive ("4WD") configurations, two-wheel drive ("2WD"), rear-wheel drive configurations ("RWD"), and front-wheel drive ("FWD") configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. The drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and an optional second clutch 48, which can be configured to control rotation of components within the rear axle assembly 26, though other configurations can be used.

In the particular example provided, the rear axle assembly 26 includes a driveline component (e.g. a rear drive module 50) that is constructed in accordance with the teachings of the present disclosure. It will be appreciated, however, that the teachings of the present disclosure have application to various other driveline components, such as transmissions, power take-offs, torque transfer devices, transfer cases, front axle assemblies, banjo or Salisbury style front or rear axles, front or rear beam axles, and any other power transmitting components that have a pinion gear, ring gear, and a housing that forms a sump through which the ring gear rotates.

Figure 2:
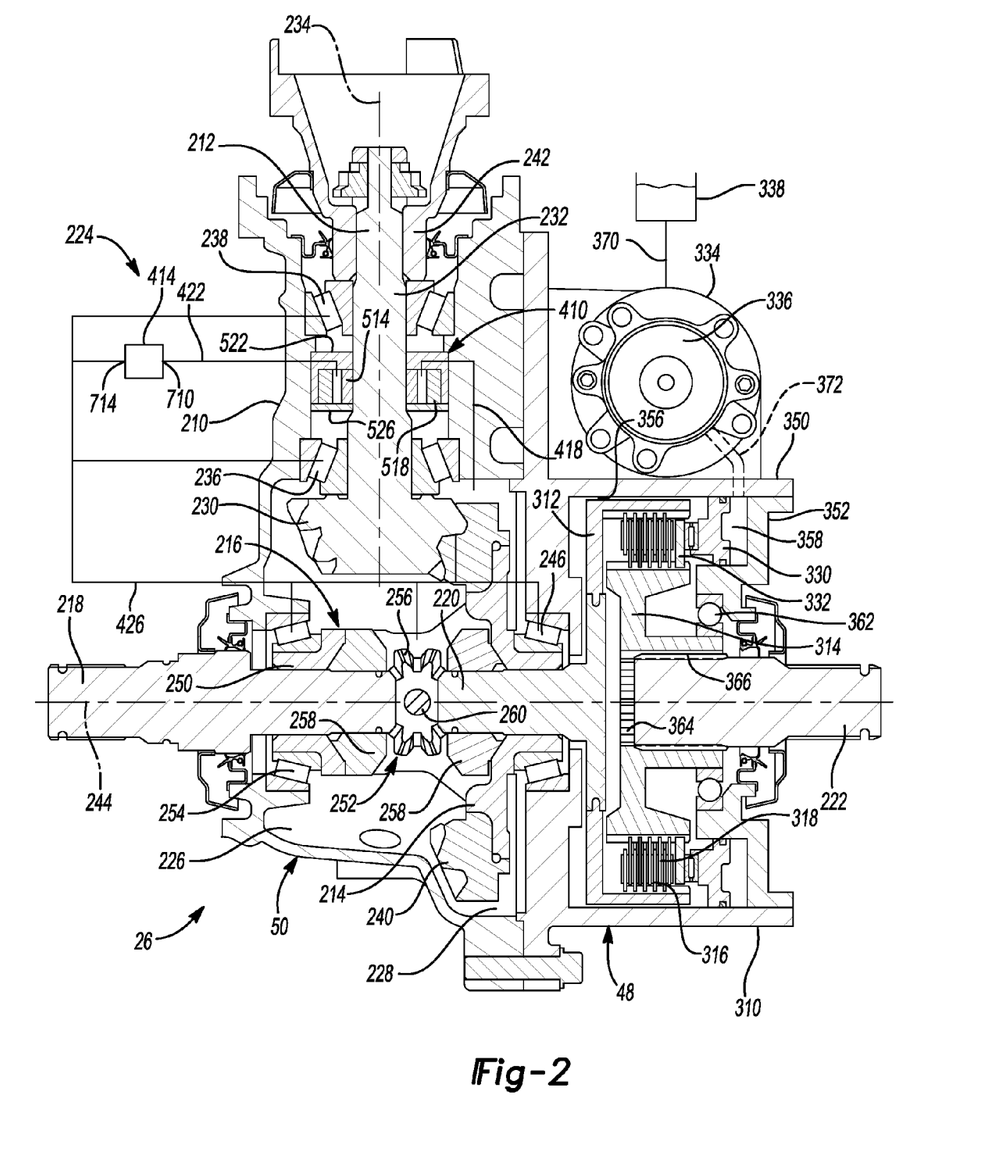
FIG. 2 is a sectional view of the driveline component of FIG. 1, illustrating a fluid management system including a pump disposed about an input pinion shaft.
Figure 3:
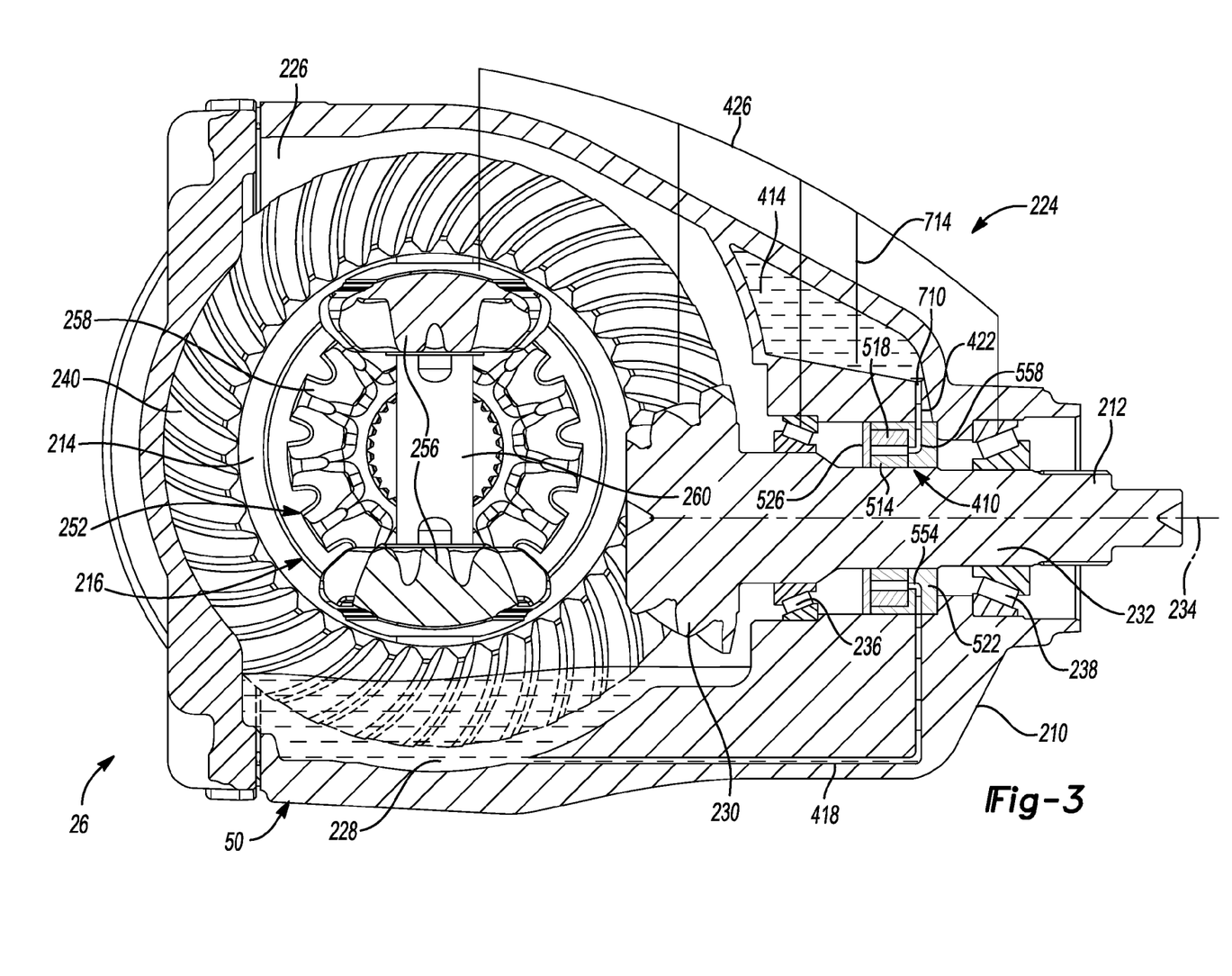
FIG. 3 is a sectional view of a portion of the driveline component of FIG. 2, illustrating the fluid management system.

With reference to FIGS. 2 and 3, the rear drive module 50 is illustrated in more detail. In the example provided, the rear drive module 50 is a type known as a split-shaft drive module, though other types can be used. The rear drive module 50 of the particular example provided can include a housing 210, an input pinion 212, an input member 214, the second clutch 48, a differential assembly 216, a first output shaft 218, a second output shaft 220, a third output shaft 222, and a fluid management system 224. The housing 210 can define a first cavity 226 that can include a sump 228. The sump 228 can be configured to hold a volume of lubricant fluid (not shown). The input pinion 212 can be a hypoid pinion having a hypoid gear 230, an input pinion shaft 232, and an input pinion flange 242. The input pinion flange 242 can be drivingly coupled to the prop shaft 24 (FIG. 1). The hypoid gear 230 can be disposed within the first cavity 226. The input pinion shaft 232 can be supported for rotation in the housing 210 along a first axis 234 by a head bearing 236 proximate to the hypoid gear 230 and a tail bearing 238 distal to the hypoid gear 230 and proximate to the input pinion flange 242 and prop shaft 24 (FIG. 1). The input member 214 can include a ring gear 240. The input member 214 can be supported for rotation in the housing 210 about a second axis 244 by a bearing 246. The second axis 244 can be generally transverse or perpendicular to the first axis 234. The ring gear 240 can be meshingly engaged with the hypoid gear 230 and configured to rotate through the sump 228.

The differential assembly 216 can include a differential case 250 and a differential gearset 252. The differential case 250 can be configured for rotation about the second axis 244. The differential case 250 can be drivingly coupled to the input member 214. The differential case 250 can be supported within the housing 210 by a bearing 254 and can be fixedly coupled to the input member 214 for common rotation about the second axis 244. The differential gearset 252 can be configured to transmit rotary power between the differential case 250 and the first and second output shafts 218, 220. In the example provided, the differential gearset 252 includes a pair of side gears 256 and a pair of output gears 258 disposed within the differential case 250. The side gears 256 can be coupled for rotation with the differential case 250 about the second axis 244 and coupled for rotation relative to the differential case 250 about a cross pin 260. The cross pin 260 can be generally perpendicular to the second axis 244. The output gears 258 can be meshingly engaged with the side gears 256 and configured to rotate about the second axis 244. The first output shaft 218 can be drivingly coupled to one of the output gears 258 and can be coupled for common rotation therewith. The first output shaft 218 can be drivingly coupled to one of the rear wheels 42 (FIG. 1). The second output shaft 220 can be drivingly coupled to the other of the output gears 258 and can be coupled for common rotation therewith. The third output shaft 222 can be drivingly coupled to the other one of the rear wheels 42 (FIG. 1).

The second clutch 48 can be selectively operated to transmit rotary power from the second output shaft 220 to the third output shaft 222. It will be appreciated that the rear drive module 50 can be constructed in accordance with the teachings of the present disclosure without the second clutch 48. In one example of such a configuration, not specifically shown, the second and third output shafts 220, 222 can be fixedly coupled for common rotation. In the particular example provided in FIGS. 2 and 3, the second clutch 48 is a friction clutch that is mounted co-axially with the input member 214 and the differential assembly 216 about the second axis 244. The second clutch 48 can include a clutch housing 310, an outer clutch plate carrier 312, an inner clutch plate carrier 314, a plurality of first clutch plates 316, a plurality of second clutch plates 318, a piston 330, an apply plate 332, a first pump 334, a pump motor 336, and a first reservoir 338. The clutch housing 310 can be integrally formed with or partially formed by the housing 210 of the rear drive module 50 or can be separately formed and mounted to the housing 210. The clutch housing 310 can include a shell 350 and an end cap 352. The shell 350 can be generally cylindrical in shape. The shell 350 and end cap 352 can define a second cavity 356. The shell 350 and end cap 352 can also define a piston chamber 358. The shell 350 can separate the first cavity 226 from the second cavity 356.

The outer and inner clutch plate carriers 312, 314 and the first and second clutch plates 316, 318 can be received in the second cavity 356. One of the outer and inner clutch plate carriers 312, 314 can be non-rotatably coupled to the third output shaft 222 and the plurality of first clutch plates 316. The other of the outer and inner clutch plate carriers 312, 314 can be non-rotatably coupled to the second output shaft 220 and the plurality of second clutch plates 318. In the particular example provided, the outer clutch plate carrier 312 is non-rotatably coupled to the second output shaft 220 and the plurality of first clutch plates 316, while the inner clutch plate carrier 314 is non-rotatably coupled to the third output shaft 222 and the plurality of second clutch plates 318. The inner clutch plate carrier 314 and the third output shaft 222 can be supported within the clutch housing 310 for rotation relative thereto by a bearing 362. In the example provided the bearing 362 is located radially between the inner clutch plate carrier 314 and the end cap 352, though other configurations can be used. In the example provided, the inner clutch plate carrier 314 includes a set of interior splines 364 that are meshingly engaged with a set of exterior splines 366 formed on the third output shaft 222 to non-rotatably couple the third output shaft 222 and the inner clutch plate carrier 314. The second clutch plates 318 can be interleaved with the first clutch plates 316 radially between the outer and inner clutch plate carriers 312, 314.

The piston 330 can be received in the piston chamber 358 and configured to translate along the second axis 244. The piston 330 can be configured to move within the piston chamber 358 between an extended position and a retracted position relative to the plurality of first and second clutch plates 316, 318. The first pump 334 can be mounted to the housing 210 or the clutch housing 310 proximate to the pinion shaft 232 in a space generally nestled between the housing 210 and the clutch housing 310. The pump motor 336 can be a two-way servo motor capable of running in forward and reverse and can be drivingly coupled to the first pump 334 to selectively operate the first pump 334.

The first pump 334 can be fluidly coupled to the first reservoir 338 by a first conduit 370 and fluidly coupled to the piston chamber 358 by a second conduit 372. In the example provided, the second conduit 372 is defined by the clutch housing 310. While schematically shown in FIG. 2, the first conduit 370 can also be defined by the clutch housing 310 and/or the housing 210. The first reservoir 338 can be configured to hold a hydraulic fluid. The first pump 334 can be operated in a first mode to pump the hydraulic fluid in a first direction to supply the hydraulic fluid from the first reservoir 338 to the piston chamber 358 to move the piston 330 from the retracted position to the extended position. The first pump 334 can be operated in a second mode to pump hydraulic fluid in a second direction to selectively remove hydraulic fluid from the piston chamber 358 to the first reservoir 338 to move the piston 330 from the extended position to the retracted position. The first reservoir 338 can be mounted to the housing 210 or the clutch housing 310. Alternatively, the first reservoir 338 can be integrally formed in the housing 210 or the clutch housing 310. The first reservoir 338 can also include a vent (not shown) that can vent gasses to the atmosphere or another part of the rear drive module 50.

The apply plate 332 can be disposed in the second cavity 356 between the piston 330 and the plurality of first and second clutch plates 316, 318. The piston 330 can be configured to translate the apply plate 332 along the second axis 244 to selectively engage the first and second clutch plates 316, 318 to compress the first and second clutch plates 316, 318 against one another so that the second clutch 48 can transmit rotary power between the second and third output shafts 220, 222. It will be appreciated that the second clutch 48 can be configured to not transmit rotary power between the second and third output shafts 220, 222 when the piston 330 is in the retracted position. The second clutch 48 can also be configured to transmit various levels of torque by varying the position of the piston 330 relative to the first and second clutch plates 316, 318.

The fluid management system 224 can include a second pump 410, a second reservoir 414, a first conduit 418, a second conduit 422, and at least one lubrication conduit 426. The second pump 410 can be received in the housing 210 and can be disposed generally about the input pinion shaft 232. In the example provided, the second pump 410 is disposed axially between the head and tail bearings 236, 238. The second pump 410 can be coupled for fluid communication with the first conduit 418 and the second conduit 422. The first conduit 418 can be coupled for fluid communication with the sump 228. The second conduit 422 can fluidly couple the second pump 410 to the second reservoir 414. The first and second conduits 418, 422 can be partially or entirely defined by the housing 210.

Figure 4:
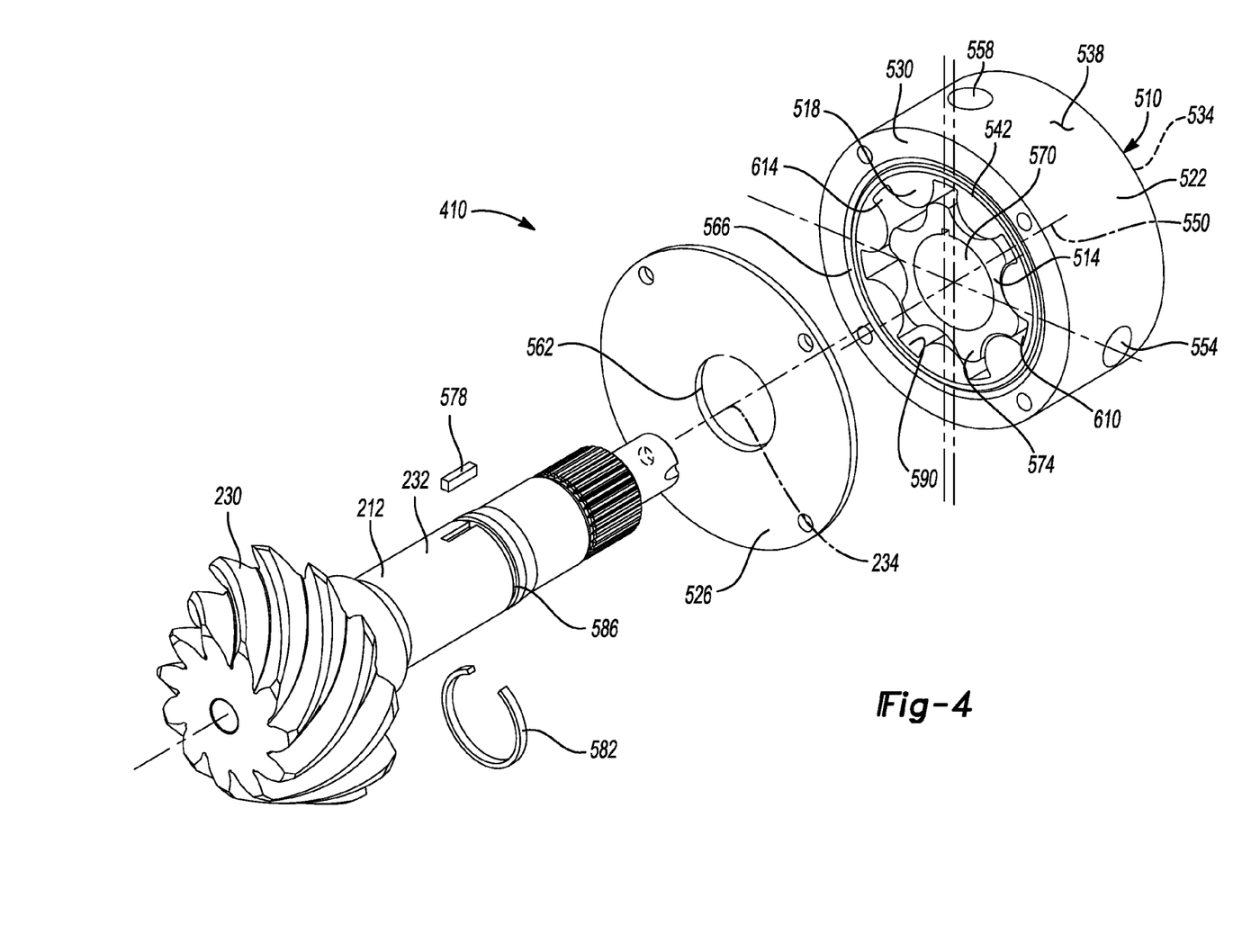
FIG. 4 is a perspective view of a portion of the driveline component of FIG. 2, illustrating an example of a pump for use in the fluid management system.

With additional reference to FIG. 4, a partially exploded perspective view of a portion of the rear drive module 50 is illustrated. In the particular example provided, the second pump 410 is a gerotor style pump, though other constructions or types of pumps can be used. The second pump 410 can include a pump housing 510, a first or inner rotor 514, and a second or outer rotor 518. The pump housing 510 can be generally disposed about the input pinion shaft 232 about the first axis 234. The pump housing 510 can be a generally cylindrical shape that can be coaxial with the first axis 234, though other constructions can be used. The pump housing 510 can be received in the housing 210 and can be non-rotatably coupled to the housing 210 by any suitable means, such as splines (not shown) or press fit for example. In the particular example provided, the housing 510 can include a main body 522 and an end cap 526. The main body 522 can have a first side 530, a second side 534, and a cylindrical outer surface 538. The main body 522 can define a cylindrical cavity 542 that can be centered on a third axis 550 and can be open to the first side 530. The third axis 550 can be parallel to and offset from the first axis 234. The main body 522 can also define an inlet 554 and an outlet 558, though it is understood that either or both of the inlet 554 and outlet 558 can alternatively be defined by the end cap 526. The inlet 554 can be coupled for fluid communication with the first conduit 418. The outlet 558 can be coupled for fluid communication with the second conduit 422. The inlet 554 and outlet 558 can be configured for fluid communication with the cylindrical cavity 542 at generally opposite sides of the cylindrical cavity 542. The end cap 526 can define a central aperture 562 through which the input pinion shaft 232 can be received. The end cap 526 can be configured to be coupled to the main body 522 to cap the first side 530 and the cylindrical cavity 542, by any suitable means such as by threaded fasteners for example. The end cap 526 and main body 522 can be sealed by a seal 566 such as an o-ring for example.

Figure 5:
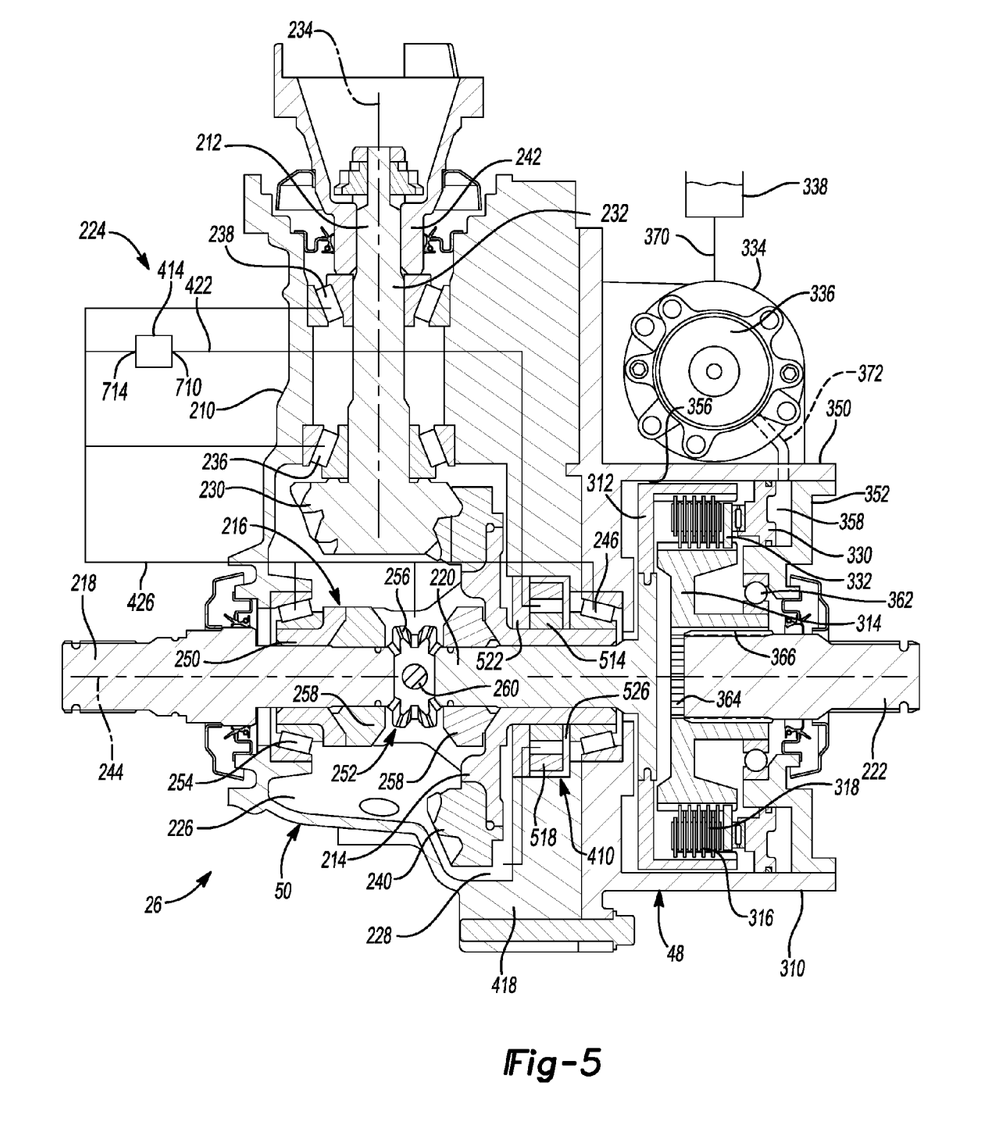
FIG. 5 sectional view similar to FIG. 2, illustrating a fluid management system of a second configuration including a pump disposed about a second input member.

The inner rotor 514 can be disposed about the input pinion shaft 232 and can be centered about the first axis 234. The inner rotor 514 can define a central aperture 570 and a plurality of external teeth 574. The input pinion shaft 232 can be received through the central aperture 570. The inner rotor 514 can be non-rotatably coupled to the input pinion shaft 232. Alternatively, the inner rotor 514 can be disposed about a portion of the input member 214 and can be coupled for common rotation with the input member 214, as shown in FIG. 5. Returning to the particular example provided in FIGS. 2-4, the inner rotor 514 is coupled for common rotation with the input pinion shaft 232 by a key 578 though any suitable means can be used, such as splines for example. In the particular example provided, the inner rotor 514 can be restrained axially relative to the input pinion shaft 232 by a retainer 582, such as a C-clip received in a groove 586 of the input pinion shaft 232 for example though other suitable constructions can be used. In the particular example provided, the inner rotor 514 includes six external teeth 574, though other numbers of teeth can be used.

The outer rotor 518 can be generally cylindrical in shape and can be rotatably received in the cylindrical cavity 542 of the main body 522. The outer rotor 518 can be disposed about the inner rotor 514 and can be centered about the third axis 550. The outer rotor 518 can define a plurality of internal teeth 590 that can be configured to meshingly engage the plurality of external teeth 574. In the particular example provided, the outer rotor 518 defines seven internal teeth 590, though other configurations can be used. It is understood that the outer rotor 518 can generally define one more internal tooth 590 than the number of external teeth 574 of the inner rotor 514, though other configurations can be used. The inner and outer rotors 514, 518 can define an intake chamber 610 and an output chamber 614. The inlet 554 can be in fluid communication with the intake chamber 610. The outlet 558 can be in fluid communication with the output chamber 614. Rotation of the inner rotor 514 about the first axis 234 can rotate the outer rotor 518 about the third axis 550, such that the inner and outer rotors 514, 518 can rotate relative to each other. Relative rotation of the inner and outer rotors 514, 518 can cause the volume of the intake chamber 610 to expand to draw fluid into the intake chamber 610 from the inlet 554, while causing the volume of the output chamber 614 to reduce to expel fluid from the output chamber 614 through the outlet 558.

Returning to FIGS. 2 and 3, the lubrication conduits 426 can fluidly couple the second reservoir 414 to at least one component of the rear drive module 50. In the particular example provided, the fluid management system 224 includes a plurality of lubrication conduits 426 configured to deliver or spray the fluid from the second reservoir 414 to the head and tail bearings 436, 438, the bearings 246 and 254, the gears 256 and 258 of the differential gearset 252, and the interface of the pinion and ring gears 230, 240, though other numbers of conduits and configurations can be used. The lubrication conduits 426 can be partially or entirely defined by the housing 210. Each of the lubrication conduits 426 can also be constructed to have different flow rates, such as different diameters or additional valves (not shown) for example, such that different components of the rear drive module 50 can receive different amounts of lubrication fluid.

The second reservoir 414 can be configured to hold a volume of the lubricant fluid at an elevated pressure. The second reservoir 414 can be defined by the housing 210 or can be separate from the housing 210. The second reservoir 414 can also be an accumulator having a variable volume chamber partially defined by a movable element (not shown), such as a bladder or a piston for example, that is configured to maintain pressure on fluid within the reservoir 414. With specific reference to FIG. 3, the second reservoir 414 can be disposed above the input pinion 212 and can be generally within the first cavity 226 above the sump 228. The second reservoir 414 can include an inlet 710 and at least one outlet 714. The inlet 710 and outlets 714 can be configured such that the maximum flow rate into the second reservoir 414 can be greater than the maximum total flow rate exiting the second reservoir 414. In the particular example provided, the outlets 714 have a smaller diameter than the inlet 710 such that the total flow area through the outlets 714 is less than the total flow area through the inlet 710, though other constructions can be used. For example, the valves (not shown) can be used to control and regulate flow of fluid exiting the second reservoir 414. The second reservoir 414 can also include a pressure relief valve (not shown) that can be configured to vent fluid from the second reservoir 414 to the first cavity 226 if the pressure within the second reservoir 414 exceeds a predetermined pressure.

In operation, when the input pinion shaft 232 is not rotating, such as when the vehicle 10 (FIG. 1) is at rest for example, the lubrication fluid can collect in the sump 228. When the input pinion shaft 232 rotates, such as when the input pinion 212 receives input torque from the prop shaft 24 (FIG. 1) or when the second clutch 48 is engaged for example, the ring gear 240 can churn through the lubrication fluid in the sump 228. The input pinion shaft 232 can drive the inner rotor 514 to rotate within the second pump 410. Rotation of the inner rotor 514 can cause the intake chamber 610 (FIG. 4) to expand. Expansion of the intake chamber 610 (FIG. 4) can draw lubricant fluid from the sump 228, through the first conduit 418. Rotation of the inner rotor 514 can move the fluid that was drawn into the intake chamber 610 (FIG. 4) to the opposite side of the second pump 410 and into the output chamber 614 (FIG. 4). Rotation of the inner rotor 514 can contract the output chamber 614 (FIG. 4) to expel the fluid out of the second pump 410 via the second conduit 422 and to the second reservoir 414. The second reservoir 414 can hold excess fluid separate from the sump 228 to reduce churning of the ring gear 240 through the fluid.

Since the outlets 714 of the second reservoir 414 can be configured to have a lower flowrate than the second pump 410 can provide to the second reservoir 414, continued rotation of the input pinion 212 can cause pressure to build up in the second reservoir 414. The pressure in the second reservoir 414 can force the fluid through the lubrication conduits 426. The lubrication conduits can output to spray the lubrication fluid on various components such as bearings 236, 238, 246, and/or 254 and gears 230, 240, 256, and/or 258 for example. Thus, the various components of the rear drive module 50 can receive lubrication when they are rotating. Since the operation of the second pump 410 is dependent on the rotation of the input pinion 212, the amount of pressure in the second reservoir 414, and thus the flowrate of fluid to the various components can be related to the speed at which the input pinion 212 rotates. When the input pinion 212 is not rotating, gravity and any residual pressure in the second reservoir 414 can continue to feed fluid to the components for additional cooling, allowing the fluid to return to the sump 228.

Thus, the fluid management system 224 can reduce the amount of the lubricant fluid that the ring gear 240 churns through in the sump 228 while also directing lubricant fluid to components of the rear drive module 50 that benefit from lubrication when the input pinion 212 rotates.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power transfer device comprising:
  a housing defining a sump;
  a fluid received in the sump;
  a first input member configured to receive rotational power and rotate about a first axis, the first input member including a first input shaft and a first gear face;
  a second input member including a second gear face meshingly engaged with the first gear face and configured to rotate through the sump;
  a first output member and a second output member;
  a differential including a differential case and a differential gearset, the differential case being drivingly coupled to the second input member, the differential gearset being configured to transmit rotary power between the differential case and the first and second output members;
  a pump disposed about the first input shaft and having an inlet, an outlet, and a pump element, the inlet being coupled for fluid communication with the sump, wherein the pump element is drivingly coupled to the first input shaft and configured to pump the fluid from the sump when the first input shaft rotates about the first axis; and
  a reservoir that is spaced apart from the sump and configured to hold an amount of pressurized fluid, the reservoir having an inlet and an outlet, the inlet of the reservoir being coupled for fluid communication with the outlet of the pump, the outlet of the reservoir being configured to dispense the fluid to at least one component of the power transfer device;
  wherein the reservoir is an accumulator.

2. The power transfer device of claim 1, wherein the pump includes an inner rotor and an outer rotor, the inner rotor being coupled to the first input shaft for common rotation about the first axis, the outer rotor being disposed about the inner rotor and configured to rotate about a second axis that is offset from the first axis.

3. The power transfer device of claim 2, wherein the pump includes a pump housing non-rotatably coupled to the housing, and the outer rotor is rotatably received within the pump housing.

4. The power transfer device of claim 1, wherein the outlet of the reservoir has a diameter that is less than the diameter of the inlet of the reservoir.

5. The power transfer device of claim 4, wherein the at least one component includes one of a bearing, the first gear face, the second gear face, and the differential gearset.

6. The power transfer device of claim 1, further comprising a first bearing and a second bearing, the first and second bearings supporting the first input shaft within the housing for rotation about the first axis, wherein the pump is disposed axially between the first and second bearings.

7. The power transfer device of claim 1, wherein the pump is a gerotor pump.

8. A power transfer device comprising:
a housing defining a sump;
a fluid received in the sump;
a first input member configured to receive rotational power and rotate about a first axis;
a second input member being meshingly engaged with the first input member and configured to rotate through the sump;
a first output member and a second output member;
a differential including a differential case and a differential gearset, the differential case being drivingly coupled to the second input member, the differential gearset being configured to transmit rotary power between the differential case and the first and second output members;
a pump including a pump housing and a first rotor, the pump housing having an inlet coupled for fluid communication with the sump, the first rotor being rotatably received within the pump housing and disposed about a portion of one of the first or second input members, the first rotor being coupled for common rotation with the one of the first and second input members, wherein the pump is configured to pump the fluid from the sump when the first rotor rotates within the housing; and
a reservoir that is spaced apart from the sump and configured to hold a volume of the fluid at an elevated pressure relative to the sump, the reservoir having an inlet and an outlet, the inlet of the reservoir being coupled for fluid communication with an outlet of the pump, the outlet of the reservoir being configured to dispense the fluid to at least one component of the power transfer device;
wherein the reservoir is an accumulator.

9. The power transfer device of claim 8, wherein the pump includes a second rotor, the second rotor being disposed about the first rotor and meshingly engaged with the first rotor, the second rotor being configured to rotate within the pump housing about a second axis that is offset from the first axis.

10. The power transfer device of claim 8, wherein the outlet of the reservoir has a diameter that is less than the diameter of the inlet of the reservoir.

11. The power transfer device of claim 8, wherein the at least one component includes one of a bearing, a gear face of one of the first and second members, and the differential gearset.

12. The power transfer device of claim 8, further comprising a first bearing and a second bearing, the first and second bearings supporting the first input member within the housing for rotation about the first axis, wherein the pump is disposed axially between the first and second bearings.

13. The power transfer device of claim 8, wherein the pump is a gerotor pump.

14. A power transfer device comprising:
a housing defining a sump;
a fluid received in the sump;
a first input member configured to receive rotational power and rotate about a first axis;
a second input member being meshingly engaged with the first input member and configured to rotate through the sump;
a first output member and a second output member;
a differential including a differential case and a differential gearset, the differential case being drivingly coupled to the second input member, the differential gearset being configured to transmit rotary power between the differential case and the first and second output members;
a gerotor pump including an inner rotor and an outer rotor, the inner rotor having a plurality of outer teeth and being coupled for common rotation with the first input member about the first axis, the outer rotor having a plurality of inner teeth meshingly engaged with the plurality of outer teeth, the outer rotor being disposed about the inner rotor and rotatable about a second axis that is offset from the first axis, wherein the gerotor pump is configured to pump the fluid from the sump through a first fluid conduit and to a second conduit when the inner rotor rotates about the first axis; and
a reservoir that is spaced apart from the sump and configured to hold a volume of the fluid at an elevated pressure relative to the sump, the reservoir having an inlet and an outlet, the inlet of the reservoir being coupled for fluid communication with an outlet of the pump via the second fluid conduit, the outlet of the reservoir being coupled to a third conduit configured to dispense the fluid directly onto at least one component of the power transfer device;
wherein the at least one component includes one of a bearing, a gear face of the first or second member, and the differential gearset;
wherein the reservoir is an accumulator.

15. The power transfer device of claim 14, wherein the sump is located proximate to a bottom of the housing and the reservoir is disposed above the first input member and the outlet of the reservoir is located proximate to a bottom of the reservoir.

16. A power transfer device comprising:
a housing defining a sump;
a fluid received in the sump;
a first input member configured to receive rotational power and rotate about a first axis, the first input member including a first input shaft and a first gear face;
a second input member including a second gear face meshingly engaged with the first gear face and configured to rotate through the sump;
a first output member and a second output member;
a differential including a differential case and a differential gearset, the differential case being drivingly coupled to the second input member, the differential gearset being configured to transmit rotary power between the differential case and the first and second output members;
a pump disposed about the first input shaft and having an inlet, an outlet, and a pump element, the inlet being coupled for fluid communication with the sump, wherein the pump element is drivingly coupled to the first input shaft and configured to pump the fluid from the sump when the first input shaft rotates about the first axis; and a reservoir that is spaced apart from the sump and configured to hold an amount of pressurized fluid, the reservoir having an inlet and an outlet, the inlet of the reservoir being coupled for fluid communication with the outlet of the pump, the outlet of the reservoir being configured to dispense the fluid to at least one component of the power transfer device;

wherein the sump is located proximate to a bottom of the housing and the reservoir is disposed above the first input member and the outlet of the reservoir is located proximate to a bottom of the reservoir.

17. A power transfer device comprising:

a housing defining a sump;

a fluid received in the sump;

a first input member configured to receive rotational power and rotate about a first axis;

a second input member being meshingly engaged with the first input member and configured to rotate through the sump;

a first output member and a second output member;

a differential including a differential case and a differential gearset, the differential case being drivingly coupled to the second input member, the differential gearset being configured to transmit rotary power between the differential case and the first and second output members;

a pump including a pump housing and a first rotor, the pump housing having an inlet coupled for fluid communication with the sump, the first rotor being rotatably received within the pump housing and disposed about a portion of one of the first or second input members, the first rotor being coupled for common rotation with the one of the first and second input members, wherein the pump is configured to pump the fluid from the sump when the first rotor rotates within the housing; and a reservoir that is spaced apart from the sump and configured to hold a volume of the fluid at an elevated pressure relative to the sump, the reservoir having an inlet and an outlet, the inlet of the reservoir being coupled for fluid communication with an outlet of the pump, the outlet of the reservoir being configured to dispense the fluid to at least one component of the power transfer device;

wherein the sump is located proximate to a bottom of the housing and the reservoir is disposed above the first input member and the outlet of the reservoir is located proximate to a bottom of the reservoir.

* * * * *